United States Patent [19]
Chang et al.

[11] Patent Number: 5,147,589
[45] Date of Patent: Sep. 15, 1992

[54] METHOD OF MAKING A SHOE SOLE OF THERMOPLASTIC MATERIALS

[76] Inventors: Shui P. Chang; Rong I. Chang, both of No. 13-5, Shenlin Rd., Shenkang Hsiang, Taichung Hsien, Taiwan

[21] Appl. No.: 724,635

[22] Filed: Jul. 2, 1991

Related U.S. Application Data

[63] Continuation-in-part of Ser. No. 551,234 Jul. 11, 1990, and a continuation-in-part of Ser. No. 387,927, Aug. 1, 1989, abandoned.

[51] Int. Cl.⁵ .............................................. B29C 67/22
[52] U.S. Cl. .................................. 264/45.1; 264/46.4; 156/79; 156/245
[58] Field of Search .............. 156/79, 245, 228, 304.1, 156/304.2; 425/119, 129.2; 264/244, 45.1, 46.4; 36/28, 30 R

[56] References Cited

U.S. PATENT DOCUMENTS

| | | | |
|---|---|---|---|
| 1,400,146 | 12/1921 | Eggers et al. | 156/228 |
| 2,724,676 | 11/1955 | Randall et al. | 156/285 |
| 3,085,294 | 4/1963 | Rosenbaum | 156/322 |
| 3,447,251 | 6/1969 | Drexler | 425/119 |
| 4,245,406 | 1/1981 | Landay et al. | 264/244 |
| 4,418,483 | 12/1983 | Fujita et al. | 264/45.1 |
| 4,434,518 | 3/1984 | Watanabe | 264/244 |
| 4,453,996 | 6/1984 | Terlizzi, Jr. et al. | 264/244 |
| 4,564,966 | 1/1986 | Chen | 264/244 |

*Primary Examiner*—Allan R. Kuhns
*Attorney, Agent, or Firm*—Browdy and Neimark

[57] ABSTRACT

A method of making a shoe sole which includes a midsole layer of soft material and an outsole layer having wear resistance. The midsole layer and the outsole layer are fused together in a mold which has a mold cavity smaller in size than the shoe sole and in proportion to the shoe sole. When the shoe sole is removed from the mold, the shoe sole is distorted due to a foaming of the midsole layer. The outsole layer is softened and is straightened by the midsole layer so that the shoe sole is directly formed without any cutting processes.

3 Claims, 4 Drawing Sheets

METHOD OF MAKING A SHOE SOLE OF THERMOPLASTIC MATERIALS

This application is a continuation-in-part of application Ser. No. 07/551,234, filed Jul. 11, 1990, abandoned; which is a continuation-in-part of application Ser. No. 07/387,927 filed Aug. 1, 1989, abandoned.

BACKGROUND OF THE INVENTION

The present invention relates to a method, and more particularly to a method of making a shoe sole of thermoplastic materials.

Rubber materials have been widely used as shoe sole material because of their wear resistance and elasticity. U.S. Pat. No. 4,418,483 to Fujita et al. discloses a method of manufacturing sole material, wherein a midsole layer and outsole layer of synthetic resin sheets are superposed and put between mold pieces, and hot pressed into one piece by fusion. The piece of united layers should be cut at each position P in order to form a plurality of cut out portions. Each cut out portion is laterally divided along line 1 by a splitting machine and cut into the required shape. It is very complicated and time consuming to cut the piece of united layers into cut out portions and to cut each cut out portion into the required shape. In addition, a crosslinking agent is required to crosslink the layers together. A further process is required to put a trademark or a pattern onto the peripheral surface of the shoe sole after cutting processes. This is complicated.

U.S. Pat. No. 1,400,146 to Eggers et al. discloses an art of making hollow rubber articles, wherein two sheets of rubber stocks are provided and are firmly united in order to form a plurality of articles. In this method, no foamable materials are added in the rubber stocks so that the rubber stocks do not foam and expand and so that the mold cavities for receiving the rubber stocks do not need to have a reduced size than the hollow rubber articles to be made. The rubber stocks should be severed by the edges of the mold members so that stock trimmings 15a are cut off and are received in the channels or recesses 16 which should be provided in the molds. In addition, a vacuum or suction system is required to hold the rubber stock or rubber sheet in place in each socket.

SUMMARY OF THE INVENTION

The primary objective of the present invention is to provide a method of making a shoe sole wherein two layers of materials are fused together without adhesive materials in a mold cavity which is smaller than the shoe sole to be made and in proportion to the shoe sole and are directly fused together into an integral shoe sole without cutting processes.

In accordance with one aspect of the invention, there is provided a method of making a shoe sole which includes a midsole layer of soft material and an outsole layer having wear resistance. The midsole layer and the outsole layer are fused together in a mold which has a mold cavity smaller than the shoe sole to be made and in proportion to the shoe sole. When the shoe sole is removed from the mold, the midsole layer which has foaming agent is foamed or expanded, the outsole layer which has no foaming agent mixed therein is not foamed or expanded. The shoe sole is distorted due to a foaming of the midsole layer. The shoe sole is straightened by a further heating process, in which the outsole layer that is stretchable is softened and is straightened by the midsole layer so that the shoe sole is directly formed without any cutting processes.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
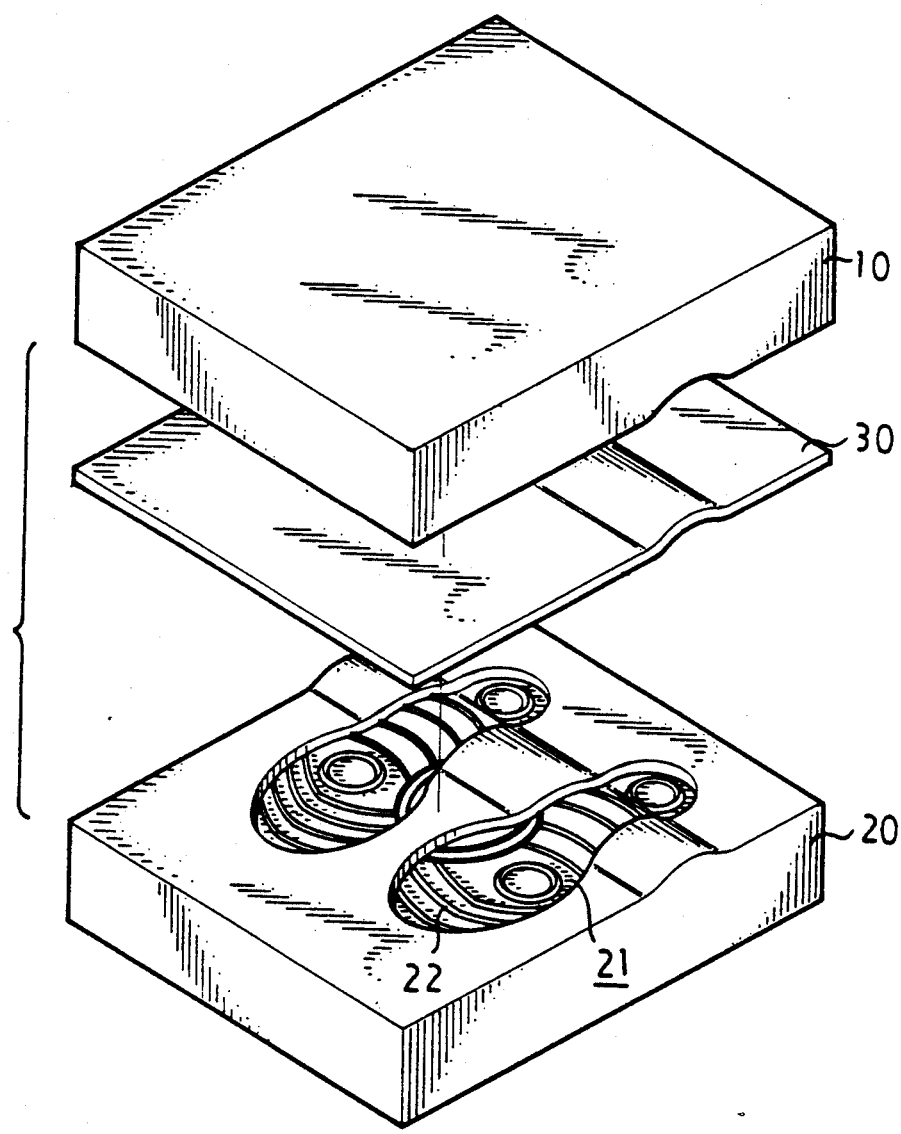
FIG. 1 is a partial perspective view of a mold used in the process of the invention.
Figure 2:
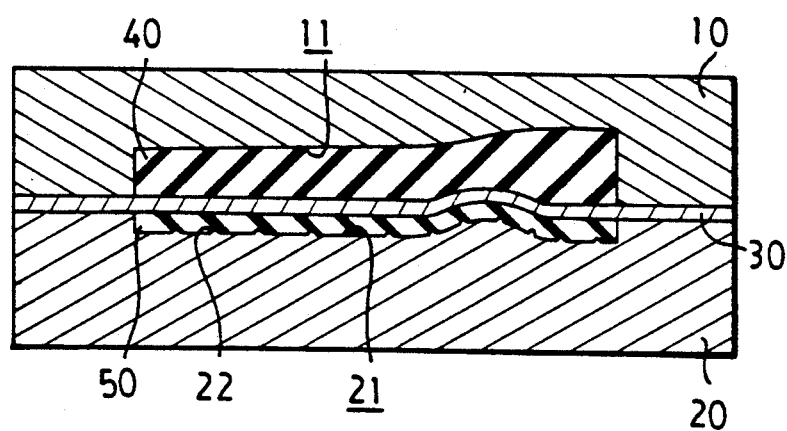
FIG. 2 is a cross sectional view of the mold, in which a center plate is employed, and a material for the midsole layer and the material for the outsole layer are filled within the mold cavities of the mold.
Figure 5:
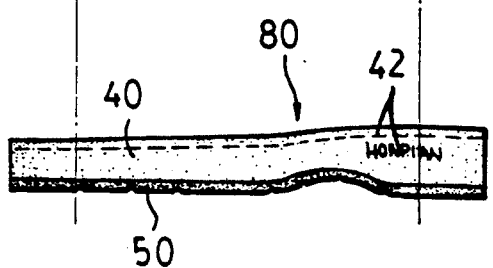
FIG. 5 is a side view of the shoe sole formed after a late heating process.

Referring to the drawings and initially to FIGS. 1 and 2, a mold 1 comprises generally an upper mold 10 and a lower mold 20 with a mold cavity 11, 21 formed in the upper mold 10 and the lower mold 20 respectively. A number of patterns, grooves or carvings 22 are formed in the mold cavity 21 of the lower mold 20, and a number of patterns, such as trademark are formed in an inner peripheral surface of the mold cavity 11 of the upper mold 10. A plate 30 is provided between the upper mold 10 and the lower mold 20. As shown in FIG. 5, the shoe sole 80 which is to be produced includes a midsole layer 40 and an outsole layer 50. It is to be noted that the sizes of the mold cavities 11, 21 are smaller than the size and shape of the shoe sole 80 and are in proportion to the shoe sole 80. The proportion ranges from 1.1 to 1.5. The reason why the mold cavities should be smaller than the size of the shoe sole will be described hereinafter.

A material, such as synthetic rubber, for midsole layer 40 is placed within the mold cavity 11 of the upper mold 10; and a material, such as a polymer blend is placed within the mold cavity 21 of the lower mold 20. The materials are hot-pressed in the respective mold cavities 11, 21 for about one minute when the plate 30 is placed between the upper mold 10 and the lower mold 20 so that the materials are solidly filled within the mold cavities 11, 21 of the molds 10, 20 respectively, especially filled within the spaces formed in the patterns 22 or the patterns in the upper mold 10, as shown in FIG. 2. The molds 10, 20 are then separated and the plate 30 removed. It is to be noted that this hot-pressing process lasts for only about one minute. This is too short for the material for midsole layer to be foamed or expanded so that the plate 30 can be removed before the material is expanded.

Figure 3:
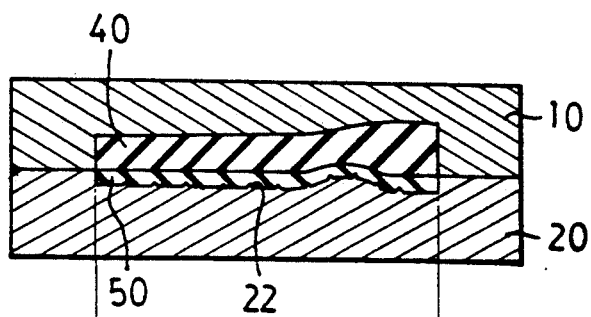
FIG. 3 is a cross sectional view of the mold, in which the center plate is removed.

The materials are compressed within the mold cavities 11, 21 and contact with each other when the molds 10, 20 are brought together, as shown in FIG. 3. Then, the materials are hot-pressed at a temperature ranging from 110° to 170° C. under a pressure ranging from 60 to 120 kg/cm² so that the materials are fused together to form a shoe sole of a united body. This is the vulcanization process. When the layers are hot-pressed under adequate conditions to form crosslinkages in the materials, the patterns 22 in the lower mold 20 and the patterns in the upper mold 10 are transferred on the surfaces of the shoe sole 80.

The materials for constituting the midsole layer 40 comprises Styrene-butadiene rubber (hereinafter abbreviated as SBR) or Acrylonitrile-butadiene rubber (NBR) or thermo-plastic elastomer (TPE), such as Tufprene-414 or Asaprene-475 made by Asahi Chemical Industries Co., foaming agent or blowing agent, such as sulfonyl hydrazide or Dinitroso Pentamethylene Tetramine (DPT), and a vulcanizing agent, such as sulfur or peroxides, . . . etc. The midsole layer 40 which contacts and bears a foot of a user may be foamed or expanded by the foaming agent so that the user may feel comfortable. The primary materials for constituting the outsole layer 50 includes vulcanizing agent and a polymer blend which is a mixture of TPE or SBR or NBR and plastics, such as polystyrene (abbreviated as PS) or ethylene-vinyl acetate copolymer (EVA), or polyvinyl chloride (PVC) etc. A commercially available polymer blend is, such as, 503H made by B. F. Goodrich Chemical, or Nipol P-70 made by Nippon Zeon Co., LTD. No foaming agent is added into the materials for forming the outsole layer 50 so that the outsole layer 50 has high strength and high durability.

Figure 4:
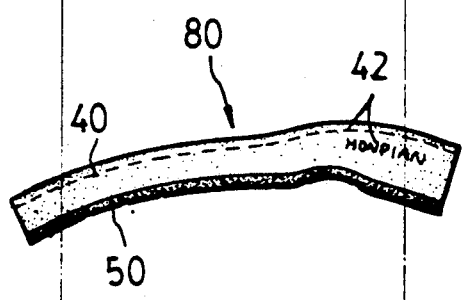
FIG. 4 is a side view of a shoe sole formed after the vulcanization process.

After the hot-pressing process, the shoe sole 80 which is a united body including the fused midsole layer 40 and the outsole layer 50 is removed from the molds 10, 20. Since a foaming agent is mixed within the materials for forming the midsole layer 40 and no foaming agent is mixed within the materials for forming the outsole layer 50, the midsole layer 40 expands or foams with a foaming ratio ranging from 1.1 to 1.5 and the outsole layer 50 does not expand so that the shoe sole 80 is deformed or distorted as shown in FIG. 4. The required cushioning properties of the type of the shoes are determined by the foaming ratio of the midsole layer. The midsole layer 40 has a porous configuration after foaming; i.e. a plurality of air bubbles will be formed within the midsole layer 40.

Since the shoe sole 80 is distorted, a later heating process is required to straighten the shoe sole 80. The shoe sole 80 is placed upon a heated plate or in a oven, which is conventionally applied to heat the rubber, so that the shoe sole 80 can be heated again. The midsole layer 40 will be expanded due to the porous configuration of the midsole layer 40 when the shoe sole 80 is heated again, and the outsole layer 50 which comprises the polymer blend will be softened by heat and will be stretched and lengthened by the midsole layer 40 when the midsole layer 40 expands. After cooling, both the midsole layer 40 and the outsole layer 50 will be cured and the midsole layer 40 has a larger shrinkage ratio than that of the outsole layer 50 due to the porous configuration of the midsole layer 40 so that the outsole layer 50 will be straightened by the midsole layer 40 when the midsole layer 40 and the outsole layer 50 are cooled. Therefore, a shoe sole 80 which has a required size can be formed as shown in FIG. 5. Since the shoe sole expands or foams to the required size with a foaming rate ranging from 1.1 to 1.5, the mold cavities 11, 21 have a size and a shape smaller than that of the shoe sole 80 and in proportion to the shoe sole 80.

A test is made with the following materials:

A: acrylonitrile-butadiene rubber &    A': A + foaming agent

-continued plastic polymer blend (TPR)
B: styrene-butadiene (rubber)    B': B + foaming agent
C: A + B    C': C + foaming agent in which, generally, the material A is a thermoplastic rubber (TPR), and the material B is a thermosetting rubber. The materials A, B and C are used for the outsole layer 50, and the materials A', B' and C' which are respectively added with foaming agent are used for the midsole layer 40. All the materials mentioned above contain vulcanizing agent. Table 1 shows the result.

TABLE 1

| MATERIALS | RESULTS |
|---|---|
| A & A' | well adhered & straightened |
| A & C' | well adhered & straightened |
| B & B' | well adhered but twisted or distorted |
| B & C' | well adhered but twisted or distorted |
| C & C' | well adhered & straightened |

From Table 1, it can be seen that the material B, which is a thermosetting rubber, will never be straightened because it has been thermoset in the vulcanization process. The materials A and C which have elongating and thermosetting characteristics during late heating are preferable and can be straightened after the late heating process.

Accordingly, the shoe sole made by the method in accordance with the present invention is directly formed without cutting processes. The midsole layer and the outsole layer can be fused together without any adhesive materials. The outer appearance of the shoe sole is integral and smooth. In addition, a trademark or a suitable pattern 42 is directly formed on the peripheral surface of the shoe sole 80 when a corresponding trademark or a corresponding pattern is carved in the inner peripheral surfaces of the mold cavities 11, 21, and no further processes are required to put the trademark onto the shoe sole 80.

Figure 6:
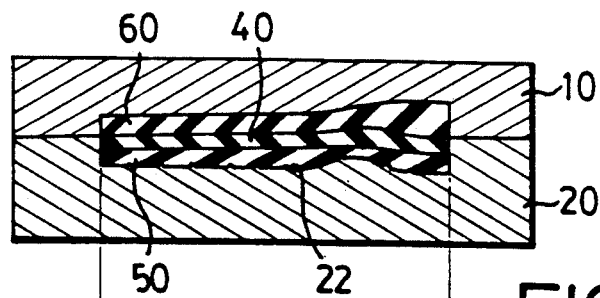
FIGS. 6, 7 and 8 are similar to FIGS. 3 to 5 illustrating another embodiment of the invention.
Figure 7:
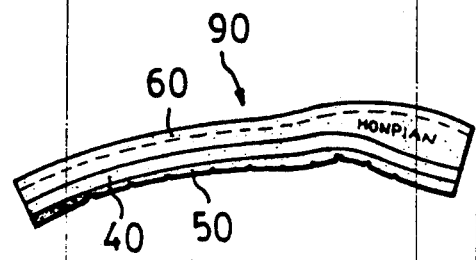
Figure 8:
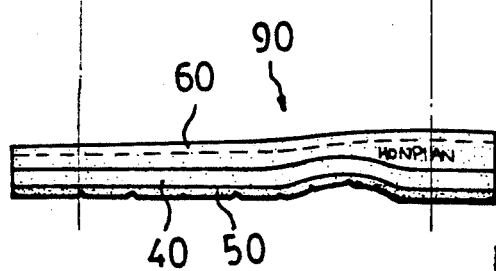

Alternatively, as shown in FIGS. 6 to 8, the shoe sole 90 may further comprises an insole layer 60 disposed above the midsole layer 40. The material for the insole layer 60 is disposed within the mold cavity 11 of the upper mold 10, and the materials for the outsole layer 50 and the midsole layer 40 are disposed within the mold cavity 21 of the lower mold 20. The material for the insole layer 60 includes foaming agent so that the insole layer 60 will be foamed and expanded by the foaming agent and so that the insole layer 60 has a porous configuration. The insole layer 60 which contacts and bears the foot of the user will expand and foam so that the user may feel more comfortable. The insole layer 60 is preferably softer than the midsole layer 40, or the foaming ratio of the insole layer 60 is preferably larger than that of the midsole layer 40. The insole layer 60 also has a porous configuration. The outsole layer will be stretched and lengthened by the midsole layer and the insole layer when the midsole layer and the insole layer are heated again and the outsole layer will be straightened by the midsole layer and the insole layer after cooled.

Further alternatively, the shoe sole may comprises two layers which all comprise a foaming agent and a vulcanizing agent so that the two layers are foamable, the upper layer further comprises a synthetic rubber, and the lower layer further comprises a polymer blend which includes synthetic rubber and plastic. The foaming ratio of the upper layer is larger than that of the lower layer. The upper layer is preferably softer than the lower layer, and the lower layer has a higher durability than that of the upper layer. The upper layer and the lower layer can be fused together under heat and will be deformed or distorted. The lower layer will be stretched and lengthened when the upper layer and the lower layer are heated again. The upper layer has a shrinkage ratio larger than that of the lower layer so that the lower layer will be straightened when the upper layer and the lower layer are cooled.

EXAMPLE

Compositions shown in Table 2, Table 3 and Table 4 are given for outsole layer 50, midsole layer 40 and the insole layer 60 respectively.

TABLE 2

| Component | (Parts by weight) | | | |
|---|---|---|---|---|
| | 1 | 2 | 3 | 4 |
| Synthetic Rubber Polymer Blend 503H (1) | 45.0 | 30.0 | 35.0 | 35.0 |
| Synthetic Rubber Polymer Blend NIPOL P-70 (2) | 35.0 | 40.0 | 40.0 | 40.0 |
| Synthetic Rubber NBR 1052 (3) | 10.0 | 10.0 | 10.0 | 10.0 |
| Synthetic Rubber SBR 1502 (4) | — | 14.0 | 12.0 | 12.0 |
| Synthetic Rubber SBR 1778 (5) | — | 2.0 | — | — |
| Synthetic Rubber IR-2200 (6) | 10.0 | — | 3.0 | — |
| Synthetic Rubber BR-01 (7) | — | 4.0 | — | 3.0 |
| Styrenated Phenol SP (Antioxidants) | 0.5 | 0.5 | 0.5 | 0.5 |
| 2-6-Di-Tert-Butyl-P-Cresol BHT | 0.5 | 0.5 | 0.5 | 0.5 |
| White Carbon VN-3 (Filler) | 4.0 | 10.0 | 5.0 | 5.0 |
| Hydrated Silica HI SIL 233 | 4.0 | 20.0 | 10.0 | 10.0 |
| Carmos Light Calcium | 3.0 | 5.0 | 3.0 | 3.0 |
| Magnesium Carbonates | 7.0 | 5.0 | — | — |
| White Hard Clay | 10.0 | 15.0 | 3.0 | 3.0 |
| Active Calcium Carbonate | 7.0 | 5.0 | 5.0 | 5.0 |
| Diethylene Gloycol (Accelerator Activator) | — | 6.0 | 2.0 | 2.0 |
| DOP (Synth Synthetic Plasticizers) | 60.0 | 45.0 | 40.0 | 53.0 |
| Zinc Oxide (Activated) | — | 3.0 | 3.0 | 3.0 |
| Stearic Acid (Lubricant) | 1.3 | 2.5 | 2.5 | 2.5 |
| MX-K (8) (Vulcanization Accelerator) | — | 2.2 | 3.0 | 1.5 |
| Dipentanethylene Thiuramtrasulfide | — | — | 0.3 | 0.5 |
| Sulfur (Vulcanizing Agent) | — | 1.6 | 4.0 | 2.1 |
| Dicumyl Peroxide (Crosslinking Agent) | 1.0 | — | — | — |

Note:
(1) 503H: B. F. Goodrich Chemical Co.
(2) NIPOL P-70: Nippon Zeon Co.
(3) NBR 1052: Nippon Zeon Co.
(4) SBR 1502: Nippon Zeon Co.
(5) SBR 1778 (TAIPOL 1778): Taiwan Synthetic Rubber Co.
(6) IR-2200: Isoprene rubber made by Shell Petroleum Co.
(7) BR-01: 1,4-polybutadiene rubber by Nippon Zeon Co.
(8) MX-K: Kawaguchi Chemical Co.

TABLE 3

| Component | (Parts by weight) | | | |
|---|---|---|---|---|
| | 1 | 2 | 3 | 4 |
| Synthetic Rubber Polymer Blend NIPOL P-70 | 45.0 | 70.0 | 55.0 | 60.0 |
| Synthetic Rubber NBR 1052 | 20.0 | 15.0 | 10.0 | 20.0 |
| Synthetic Rubber SBR 1502 | 20.0 | 9.0 | 20.0 | 10.0 |
| Synthetic Rubber SBR 1778 | — | 2.0 | — | — |
| Synthetic Rubber IR-2200 | 15.0 | — | 15.0 | — |
| Synthetic Rubber BR-01 | 2.0 | 4.0 | — | 10.0 |
| Styrenated Phenol SP (Antioxidants) | 0.5 | 0.5 | 0.5 | 0.5 |
| 2-6-Di-Tert-Butyl-P-Cresol BHT | 0.5 | 0.5 | 0.5 | 0.5 |
| White Carbon VN-3 (Filler) | 4.0 | 20.0 | 10.0 | 5.0 |
| Hydrated Silica HI SIL 233 | 4.0 | 10.0 | 10.0 | 5.0 |
| Carmos Light Calcium | 5.0 | 10.0 | 5.0 | 10.0 |
| Magnesium Carbonates | 30.0 | 10.0 | — | — |
| White Hard Clay | 5.0 | 15.0 | 5.0 | 10.0 |
| Active Calcium Carbonate | 7.0 | 10.0 | 10.0 | 10.0 |
| Diethylene Gloycol (Accelerator Activator) | 1.0 | 6.0 | 4.0 | 6.0 |
| DOP (Synth Synthetic Plasticizers) | 30.0 | 45.0 | 40.0 | 40.0 |
| Zinc Oxide (Activated) | — | 3.5 | 3.0 | 2.0 |
| Stearic Acid (Lubricant) | 1.5 | 3.0 | 3.0 | 2.0 |
| DPT ($C_5H_{10}N_6O_2$) (Organic Foaming Agent) | 2.0 | — | — | — |
| CABCELL (1) | 2.0 | — | — | — |
| AK2 (Foaming Agent) (2) | — | 7.0 | 6.0 | 6.0 |
| MX-K (Vulcanization Accelerator) | — | 3.1 | 3.5 | 4.0 |
| Sulfur (Vulcanizing Agent) | — | 2.4 | 1.8 | 2.1 |
| Dicumyl Peroxide (Crosslinking Agent) | 1.0 | — | — | — |
| Benzoyl Peroxide | 0.6 | — | — | — |

Note:
(1) CABCELL: Taishin Chemical Industry Co.
(2) AK2: "Azodicarbonamide" made by Eiwa Kasei Co.

TABLE 4

| Component | (Parts by weight) | |
|---|---|---|
| | 1 | 2 |
| Synthetic Rubber Polymer Blend NIPOL P-70 | 45.0 | 40.0 |
| Synthetic Rubber NBR 1052 | 20.0 | 10.0 |
| Synthetic Rubber SBR 1502 | 20.0 | 15.0 |
| Synthetic Rubber SBR 1778 | — | 20.0 |
| Synthetic Rubber IR-2200 | 15.0 | 15.0 |
| Styrenated Phenol SP | 0.5 | 0.5 |
| 2-6-Di-Tert-Butyl-P-Cresol BHT | 0.5 | 0.5 |
| White Carbon VN-3 (Filler) | 10.0 | 10.0 |
| Hydrated Silica HI SIL 233 | 10.0 | 10.0 |
| Carmos Light Calcium | 5.0 | 5.0 |
| Magnesium Carbonates | 20.0 | — |
| White Hard Clay | 5.0 | 5.0 |
| Active Calcium Carbonate | 5.0 | 10.0 |
| Diethylene Gloycol | 2.0 | 4.0 |
| DOP (Synth Synthetic Plasticizers) | 70.0 | 75.0 |
| Zinc Oxide (Activated) | — | 10.0 |
| Stearic Acid (Lubricant) | 1.5 | 3.0 |
| AK2 (Foaming Agent) | 2.8 | 4.0 |
| MX-K | — | 4.5 |
| Sulfur (Vulcanizing Agent) | — | 2.0 |
| Dicumyl Peroxide | 1.0 | — |
| Benzoyl Peroxide | 0.3 | — |

The compositions as shown in Tables 2, 3 and 4 are disposed within the mold cavities 11, 21 of the molds 10, 20 and can be solidly pressed within the mold cavities 11, 21 by the plate 30 and are fused together after hot pressing processes. After foaming processes and after the shoe sole is straightened, the expansion ratio of the shoe sole relative to the mold cavities can be determined when only one shoe sole is made. Accordingly, the sizes of the mold cavities corresponding to the shoe sole of required sizes can be determined.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method of making a shoe sole product comprising:

preparing an upper mold and a lower mold which have a first mold cavity and a second mold cavity formed therein respectively, said first mold cavity and said second mold cavity being smaller than said shoe sole product and having a shape in proportion to said shoe sole product, a first pattern being carved in a lower surface of said second mold cavity, and a second pattern being carved in an inner peripheral surface of said first mold cavity;

inserting a first material in said first mold cavity of said upper mold, and inserting a second material in said second mold cavity of said lower mold, said first material comprising a synthetic rubber, a vulcanizing agent and a foaming agent, said second material comprising a vulcanizing agent and a polymer blend which includes synthetic rubber and plastic, said first material being foamable, said first material and said second material being capable of being fused together under heat;

preparing a plate between said upper mold and said lower mold;

hot-pressing said first material and said second material in said first mold cavity and said second mold cavity respectively with said plate disposed therebetween;

removing said plate;

hot-pressing said first material and said second material to fuse said first material and said second material together so as to form a united body, said first pattern being transferred to a lower surface of said united body, and said second pattern being transferred to an upper peripheral surface of said united body;

removing said united body from said upper mold and said lower mold, said first material foaming by heat, said united body being distorted due to foaming of said first material, said second material not foaming; and heating said united body, said first material being expanded by heat, said second material which is stretchable being softened by heat and being stretched by said first material when said first material expands, said second material being straightened when cooled, so that said shoe sole product is directly formed without any cutting process and so that said first pattern and said second pattern are directly formed on said shoe sole product.

2. A method according to claim 1, wherein a third material is further disposed above said first material and comprises a synthetic rubber, a vulcanizing agent and a foaming agent, said first material and said third material being foamable, said first material, said second material and said third material are capable of being fused together under heat.

3. A method of making a shoe sole product comprising:

preparing an upper mold and a lower mold which have a first mold cavity and a second mold cavity formed therein respectively, said first mold cavity and said second mold cavity being smaller than said shoe sole product and having a shape in proportion to said shoe sole product, a first pattern being carved in a lower surface of said second mold cavity, and a second pattern being carved in an inner peripheral surface of said first mold cavity;

inserting a first material in said first mold cavity of said upper mold, and inserting a second material in said second mold cavity of said lower mold, said first material and said second material each comprising a vulcanizing agent and a foaming agent so that said first material and said second material are foamable, said first material further comprising a synthetic rubber, said second material further comprising a polymer blend which includes synthetic rubber and plastic, said first material and said second material being capable of being fused together under heat, a foaming ratio of said first material being larger than that of said second material;

preparing a plate between said upper mold and said lower mold;

hot-pressing said first material and said second material in said first mold cavity and said second mold cavity respectively with said plate disposed therebetween;

removing said plate;

hot-pressing said first material and said second material to fuse said first material and said second material together so as to form a united body, said first pattern being transferred to a lower surface of said united body, and said second pattern being transferred to an upper peripheral surface of said united body;

removing said united body from said upper mold and said lower mold, said first material and said second material foaming by heat, said united body being distorted due to different foaming ratios of said first material and said second material; and heating said united body, said first material and said second material being expanded by heat, said second material being further stretched by said first material, said united body being straightened when said first material and said second material are cooled so that said shoe sole product is directly formed without any cutting process and so that said first pattern and said second pattern are directly formed on said shoe sole product.

* * * * *